United States Patent
Thiagarajan et al.

(10) Patent No.: US 7,774,343 B2
(45) Date of Patent: Aug. 10, 2010

(54) MULTIPLE MEDIA VENDOR SUPPORT

(75) Inventors: Balaji Thiagarajan, San Jose, CA (US); Arvind Kumar Peechara, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 1912 days.

(21) Appl. No.: 10/123,496

(22) Filed: Apr. 15, 2002

(65) Prior Publication Data

US 2003/0196204 A1 Oct. 16, 2003

(51) Int. Cl.
*G06F 7/00* (2006.01)
*G06F 17/00* (2006.01)
*H04N 7/173* (2006.01)

(52) U.S. Cl. .................... 707/736; 707/805; 725/87; 725/93

(58) Field of Classification Search ........... 705/26; 707/1, 100, 999.104, 736, 805; 725/87, 93
See application file for complete search history.

(56) References Cited

U.S. PATENT DOCUMENTS

| | | | |
|---|---|---|---|
| 5,751,282 A | 5/1998 | Girard et al. | |
| 5,838,314 A * | 11/1998 | Neel et al. | 725/8 |
| 5,956,024 A * | 9/1999 | Strickland et al. | 715/717 |
| 5,983,068 A | 11/1999 | Tomich et al. | |
| 6,721,794 B2 | 4/2004 | Taylor et al. | |
| 6,782,550 B1 * | 8/2004 | Cao | 725/39 |
| 2002/0104093 A1 | 8/2002 | Buehl et al. | |
| 2002/0116287 A1 * | 8/2002 | Schubert et al. | 705/26 |
| 2003/0028889 A1 | 2/2003 | McCoskey et al. | |
| 2003/0088876 A1 * | 5/2003 | Mao et al. | 725/91 |
| 2006/0064583 A1 * | 3/2006 | Birnbaum et al. | 713/164 |
| 2006/0085821 A9 | 4/2006 | Simmons et al. | |

OTHER PUBLICATIONS

Kevin C. Almeroth and Mostafa H. Ammar, "An Alternative Paradigm for Scalable On-Demand Applications: Evaluating and Deploying the Interactive Multimedia Jukebox," IEEE Transactions on Knowledge and Data Engineering, vol. 11, No. 4, Jul./Aug. 1999, pp. 658-672.

Y-W Leung and EWM Wong, "An incentive charging scheme for video-on-demand," Journal of the Operational Research Society (2001) 52, pp. 55-63.

David Richardson, "Data Broadcasting—The Ultimate Push Technology?," International Broadcasting Convention, Sep. 12-16, 1997, Conference Publication No. 447, IEEE, 1997, pp. 36-42.

* cited by examiner

*Primary Examiner*—Vincent Boccio
(74) *Attorney, Agent, or Firm*—Lee & Hayes, PLLC (57) ABSTRACT

A content distribution system receives data describing media content available from one or more vendors. The content distribution system generates data that describes an offer and associates the media content data with the offer. The content distribution system provides data describing an offer to a client device. The client device receives a request for a media content offer. The media content offer may include one or more instances of media content. Each instance of media content is available from a media vendor. For each media content instance associated with the offer, the client determines a vendor able to provide the media content, and submits a request for the media content to the vendor.

20 Claims, 8 Drawing Sheets

MULTIPLE MEDIA VENDOR SUPPORT

TECHNICAL FIELD

This invention relates to television entertainment architectures that support multiple media vendors.

BACKGROUND

Many existing television entertainment systems are configured to provide video-on-demand (VOD) support, including purchasing, billing, and streaming. Different VOD vendors use different stream protocols and different listing schemas. VOD vendors may also differ in the technical features offered, such as different audio formats, whether or not subtitles are offered, the number of simultaneous streams that are available, and trick modes that are supported (e.g., pause, fast forward, rewind, etc.). There are multiple VOD vendors currently capable of providing services to specific television distribution systems. Although it would be advantageous to the television distribution system operators and the viewers to be able to interact with multiple VOD vendors, current systems are only configured to support one VOD vendor, due to the unique architecture and protocols that each VOD vendor uses. Moreover, although it would be advantageous for both viewers and operators to be able to add new VOD vendors to gain access to additional content libraries and services, the current architectures do not support the addition of a second VOD vendor.

SUMMARY

An extensible architecture that supports media content offers from multiple vendors is described. The multi-vendor media content architecture has a system to receive information describing available VOD content and generate a VOD offer, which may be associated with a plurality of media content. Support for particular VOD vendors may be dynamically added to or removed from the system. Media content associated with a VOD offer may be available from a plurality of vendors. When the system receives a request for a VOD offer, for each VOD content associated with the offer, the system determines a vendor able to provide the media content, and submits a request for the media content to the vendor.

BRIEF DESCRIPTION OF THE DRAWINGS

The same numbers are used throughout the drawings to reference like features and components.

DETAILED DESCRIPTION

The following discussion is directed to television-based entertainment systems that support video-on-demand, such as interactive TV networks, cable networks that utilize electronic program guides, and Web-enabled TV networks. Client devices in such systems range from full-resource clients with substantial memory and processing resources, such as TV-enabled personal computers and TV recorders equipped with hard-disks, to low-resource clients with limited memory and/or processing resources, such as traditional set-top boxes. While aspects of the described systems and methods can be used in any of these systems and for any types of client devices, they are described in the context of the following exemplary environment.

Exemplary Environment

Figure 1:
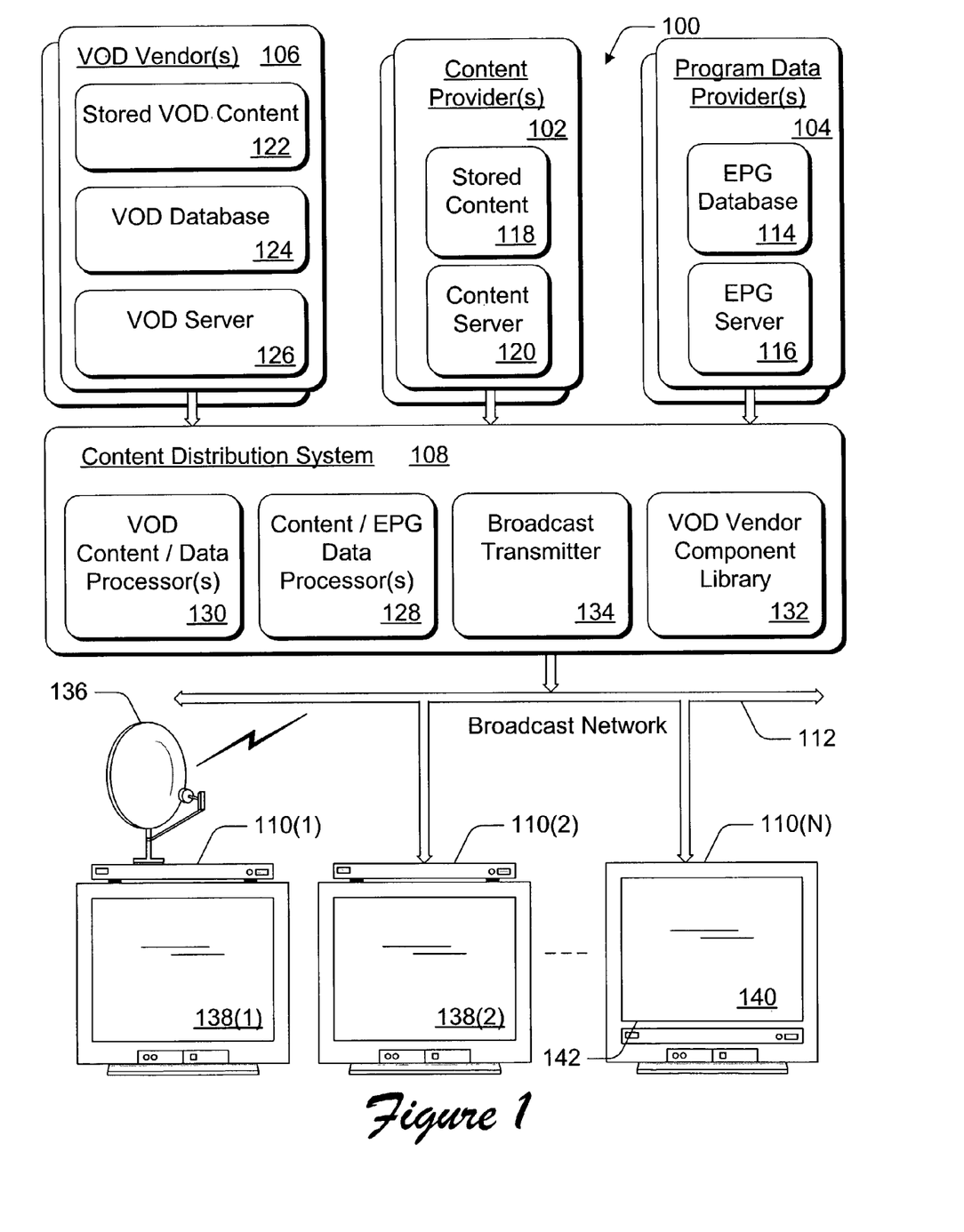
FIG. 1 illustrates an exemplary multi-vendor media distribution environment.

FIG. 1 illustrates an exemplary environment 100 in which an extensible architecture that supports media content offers from multiple vendors may be implemented. Exemplary environment 100 is a television entertainment system that facilitates distribution of content and program data to multiple viewers. The environment 100 includes one or more content providers 102, one or more program data providers 104, one or more VOD vendors 106, a content distribution system 108, and multiple client devices 110(1), 110(2), . . . , 110(N) coupled to the content distribution system 108 via a broadcast network 112.

Program data providers 104 include an electronic program guide (EPG) database 114 and an EPG server 116. The EPG database 114 stores electronic files of program data, which is used to generate an electronic program guide (or, "program guide"). Program data includes program titles, ratings, characters, descriptions, actor names, station identifiers, channel identifiers, schedule information, and so on. The terms "program data" and "EPG data" are used interchangeably throughout this discussion. For discussion purposes, an electronic file maintains program data that includes a program title, a program day or days to identify which days of the week the program will be shown, and a start time or times to identify the time that the program will be shown on the particular day or days of the week.

The EPG server 116 processes the EPG data prior to distribution to generate a published version of the program data which contains programming information for all channels for one or more days. The processing may involve any number of techniques to reduce, modify, or enhance the EPG data. Such processes might include selection of content, content compression, format modification, and the like. The EPG server 116 controls distribution of the published version of the program data from program data provider 104 to the content distribution system 108 using, for example, a file transfer protocol (FTP) over a TCP/IP network (e.g., Internet, UNIX, etc.).

Content providers 102 include a content server 120 and stored content 118, such as movies, television programs, commercials, music, and similar audio and/or video content. Content server 120 controls distribution of the stored content 118 from content provider 102 to the content distribution system 108. Additionally, content server 120 controls distribution of live content (e.g., content that was not previously stored, such as live feeds) and/or content stored at other locations to the content distribution system 108.

VOD vendors 106 include stored VOD content 122, VOD database 124, and VOD server 126. VOD database 124 is similar to EPG database 114 in that it stores VOD program data, which is used to generate an electronic VOD program guide. VOD server 126 is similar to both EPG server 116 and content server 120. VOD server 126 processes the VOD program data prior to distribution to generate a published version of the VOD program data. VOD server 126 also controls distribution of the stored VOD content 122 from VOD vendor 106 to the content distribution system 108.

Content distribution system 108 contains one or more content and EPG data processors 128, one or more VOD content and data processors 130, a VOD vendor component library 132, and a broadcast transmitter 134.

Content and EPG data processor 128 processes the program data received from program data provider 104 and the content received from content provider 102 prior to transmitting the program data and content across broadcast network 112. Similarly, VOD content and data processor 130 processes the VOD data and VOD content received from VOD vendor 106. In processing the VOD data, VOD content and data processor 130 generates one or more offers for VOD content, each with specific usage terms and pricing information. A particular content processor or VOD content processor may encode, or otherwise process, the received data or content into a format that is understood by the multiple client devices 110(1), 110(2), . . . , 110(N) coupled to broadcast network 112.

VOD vendor component library 132 stores vendor-specific software components that can be installed on the client devices 110. When installed on a s client device 110, the VOD vendor component facilitates the generation of vendor-specific VOD media requests.

Broadcast transmitter 134 broadcasts signals, such as cable television signals, across broadcast network 112. Broadcast transmitter 134 may also transmit software modules across broadcast network 112 that can be executed or installed on one or more client devices 110, including the VOD vendor components stored in the VOD vendor component library 132. Broadcast network 112 can include a cable television network, RF, microwave, satellite, and/or data network, such as the Internet, and may also include wired or wireless media using any broadcast format or broadcast protocol. Additionally, broadcast network 112 can be any type of network, using any type of network topology and any network communication protocol, and can be represented or otherwise implemented as a combination of two or more networks.

Environment 100 can include any number of content providers, any number of program data providers, and any number of VOD vendors coupled to any number of content distribution systems. Furthermore, the environment 100 facilitates an extensible architecture in that support for particular VOD vendors may be dynamically added to or removed from the system.

Content distribution system 108 is representative of a headend service that provides EPG data (including VOD data), as well as content, to multiple subscribers. Each content distribution system 108 may receive a slightly different version of the program data that takes into account different programming preferences and lineups. The EPG server 116 may create different versions of EPG data (e.g., different versions of a program guide) that include those channels of relevance to respective headend services. Similarly, VOD server 126 may create different versions of VOD data that include information about VOD content of relevance to respective headend services. Content distribution system 108 transmits the EPG data and VOD data to the multiple client devices 110(1), 110(2), . . . , 110(N). In one implementation, for example, distribution system 108 utilizes a carousel file system to repeatedly broadcast the EPG data and VOD data over an out-of-band (OOB) channel to the client devices 110.

Client devices 110 can be implemented in a number of ways. For example, a client device 110(1) receives broadcast content from a satellite-based transmitter via a satellite dish 136. Client device 110(1) is also referred to as a set-top box or a satellite receiving device. Client device 110(1) is coupled to a television 138(1) for presenting the content received by the client device (e.g., audio data and video data), as well as a graphical user interface. A particular client device 110 can be coupled to any number of televisions 138 and/or similar devices that can be implemented to display or otherwise render content. Similarly, any number of client devices 110 can be coupled to a television 138.

Client device 110(2) is also coupled to receive broadcast content from broadcast network 112 and provide the received content to associated television 138(2). Client device 110(N) is an example of a combination television 140 and integrated set-top box 142. In this example, the various components and functionality of the set-top box are incorporated into the television, rather than using two separate devices. The set-top box incorporated into the television may receive broadcast signals via a satellite dish (similar to satellite dish 136) and/or via broadcast network 112. In alternate implementations, client devices 110 may receive broadcast signals via the Internet or any other broadcast medium.

Each client 110 runs an electronic program guide (EPG) application that utilizes the program data and the VOD data. An EPG application enables a TV viewer to navigate through an onscreen program guide and locate television shows of interest to the viewer. With an EPG application, the TV viewer can look at schedules of current and future programming, view available VOD offers, set reminders for upcoming programs, and/or enter instructions to record one or more television shows.

Exemplary Client Device

Figure 2:
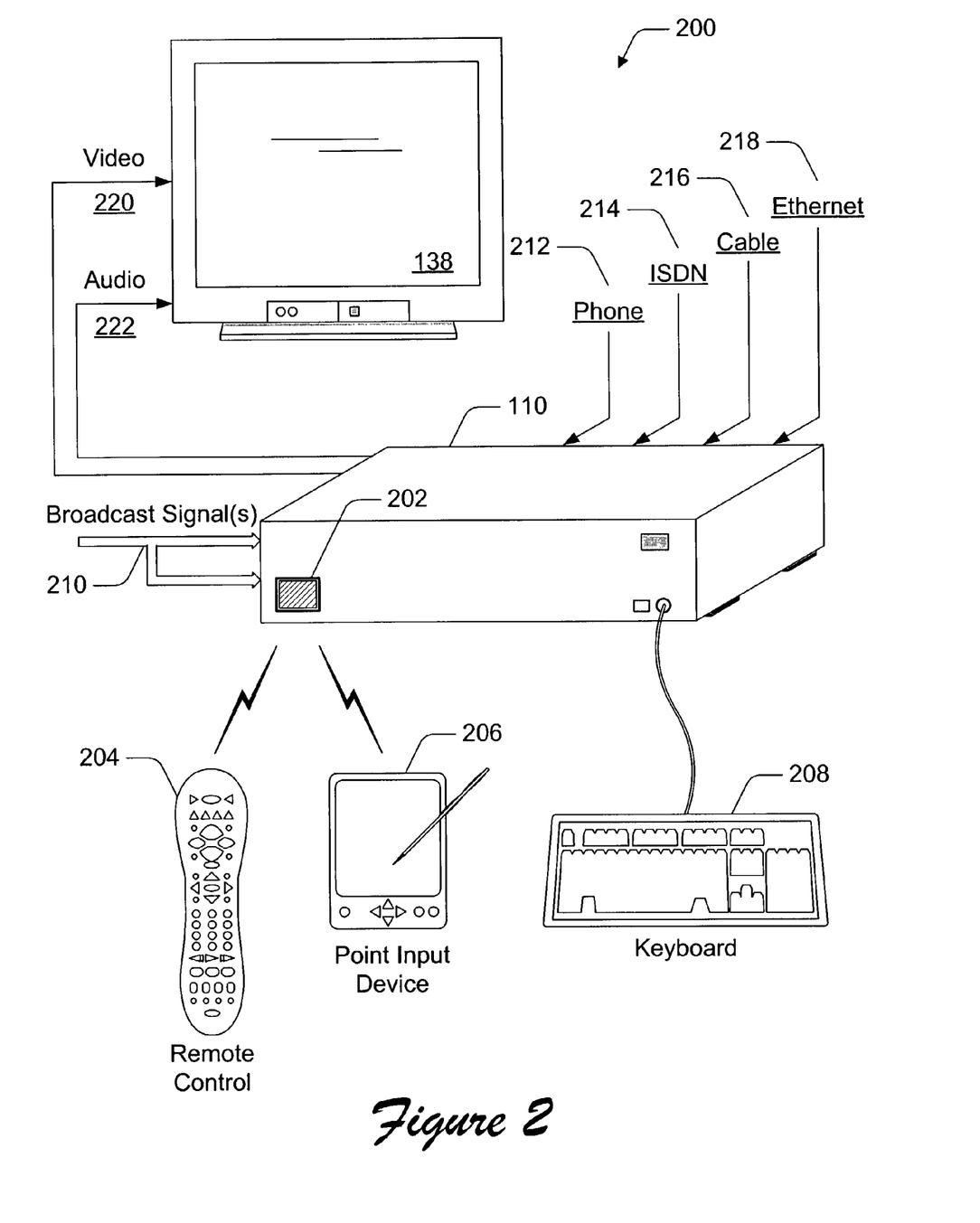
FIG. 2 illustrates an exemplary client device, television, and various input devices that interact with the client device, which may be used in the environment of FIG. 1.

FIG. 2 illustrates an exemplary implementation 200 of a client device 110 shown as a standalone unit that connects to a television 138. Client device 110 can be implemented in any number of embodiments, including as a set-top box, a satellite receiver, a TV recorder with a hard disk, a game console, an information appliance, and so forth. Client device 110 includes a wireless receiving port 202, such as an infrared (IR) or Bluetooth wireless port, for receiving wireless communications from a remote control device 204, a handheld input device 206, or any other wireless device, such as a wireless keyboard. Handheld input device 206 can be a personal digital assistant (PDA), handheld computer, wireless phone, or the like. Additionally, a wired keyboard 208 is coupled to communicate with the client device 110. In alternate embodiments, remote control device 204, handheld device 206, and/or keyboard 208 may us an RF communication link or other mode of transmission to communicate with client device 110.

Client device 110 receives one or more broadcast signals 210 from one or more broadcast sources, such as from a satellite or from a broadcast network. Client device 110 includes hardware and/or software for receiving and decoding broadcast signal 210, such as an NTSC, PAL, SECAM or other TV system video signal. Client device 110 also includes hardware and/or software for providing the user with a graphical user interface by which the user can, for example, access various network services, configure the client device 110, and perform other functions.

Client device 110 is capable of communicating with other devices via one or more connections including a conventional telephone link 212, an ISDN link 214, a cable link 216, and an Ethernet link 218. Client device 110 may use any in one or more of the various communication links 212-218 at a particular instant to communicate with any number of other devices.

Client device 110 generates video signal(s) 220 and audio signal(s) 222, both of which are communicated to television 138. The video signals and audio signals can be communicated from client device 110 to television 138 via an RF (radio frequency) link, S-video link, composite video link, component video link, or other communication link. Although not shown in FIG. 2, client device 110 may include one or more lights or other indicators identifying the current status of the device. Additionally, the client device may include one or more control buttons, switches, or other selectable controls for controlling operation of the device.

Figure 3:
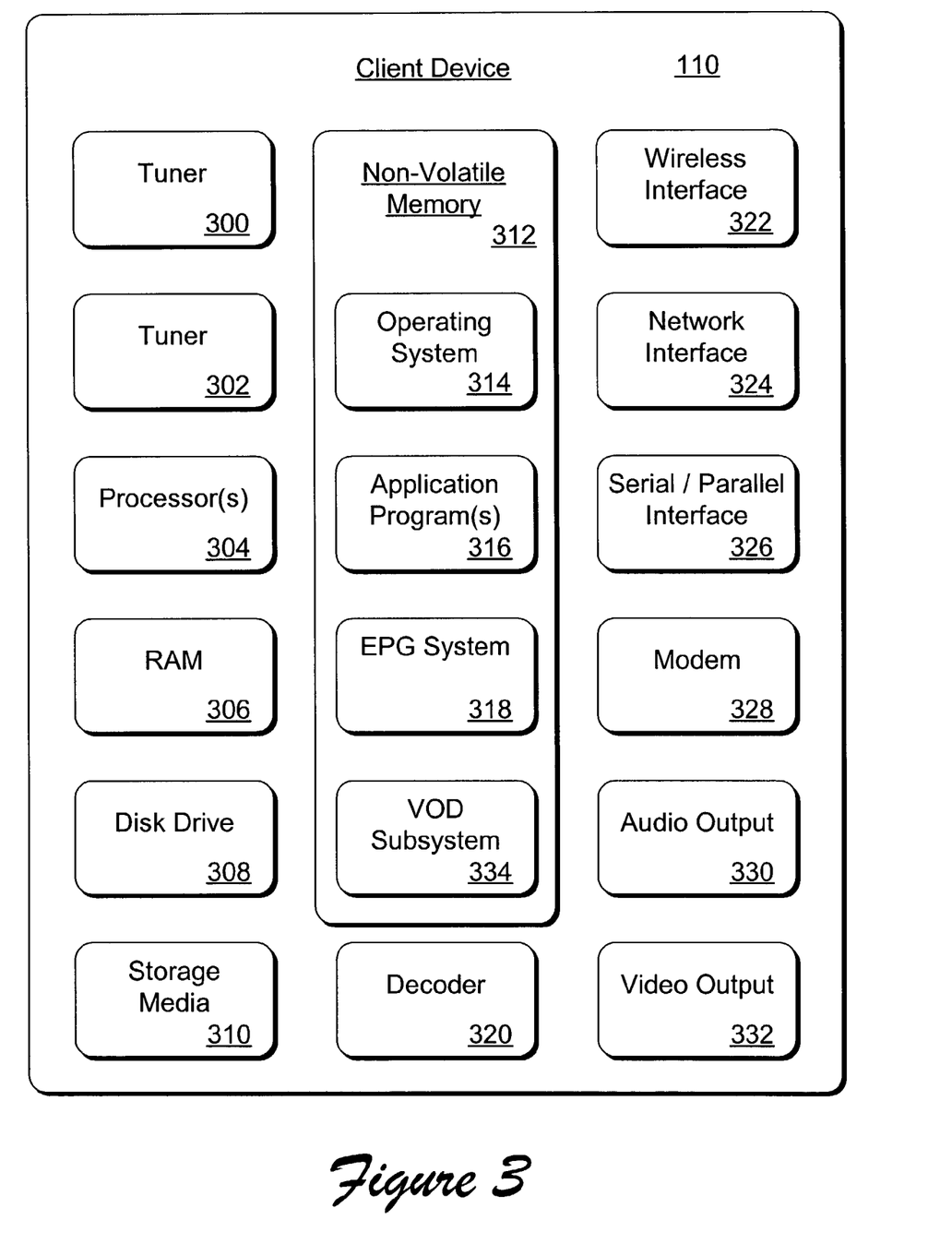
FIG. 3 is a block diagram that illustrates components of the example client device(s) shown in FIGS. 1 and 2.

FIG. 3 illustrates selected components of client device 110 shown in FIGS. 1 and 2. Client device 110 includes a first tuner 300 and an optional second tuner 302. The tuners 300 and 302 are representative of one or more in-band tuners that tune to various frequencies or channels to receive television signals, as well as an out-of-band tuner that tunes to the broadcast channel over which the EPG data and/or VOD data is broadcast to client device 110.

Client device 110 also includes one or more processors 304 and one or more memory components. Examples of possible memory components include a random access memory (RAM) 306, a disk drive 308, a mass storage component 310, and a non-volatile memory 312 (e.g., ROM, Flash, EPROM, EEPROM, etc.). Alternative implementations of client device 110 can include a range of processing and memory capabilities, and may include more or fewer types of memory components than those illustrated in FIG. 3. For example, full-resource clients can be implemented with substantial memory and processing resources, including the disk drive 308 to store content for replay by the viewer. Low-resource clients, however, may have limited processing and memory capabilities, such as a limited amount of RAM 306, no disk drive 308, and limited processing capabilities.

Processor(s) 304 process various instructions to control the operation of client device 110 and to communicate with other electronic and computing devices. The memory components (e.g., RAM 306, disk drive 308, storage media 310, and non-volatile memory 312) store various information and/or data such as content, EPG data, VOD data, configuration information for client device 110, and/or graphical user interface information.

An operating system 314 and one or more application programs 316 may be stored in non-volatile memory 312 and executed on processor 304 to provide a runtime environment. A runtime environment facilitates extensibility of client device 110 by allowing various interfaces to be defined that, in turn, allow application programs 316 to interact with client device 110. In the illustrated example, an EPG system 318 is stored in memory 312 to operate on the EPG data and VOD data to generate a program guide. A VOD subsystem 334 is stored in memory 312 to request media content from content distribution system 108 when media content is requested by a user through the EPG system 318. The application programs 316 that may be implemented at client device 110 can include a browser to browse the Web, an email program to facilitate electronic mail, and so on. Client device 110 can also include other components pertaining to a television entertainment system which are not illustrated in this example for simplicity purposes. For instance, client device 110 can include a user interface application and user interface lights, buttons, controls, etc. to facilitate viewer interaction with the device.

Client device 110 also includes a decoder 320 to decode a broadcast video signal, such as an NTSC, PAL, SECAM or other TV system video signal. Client device 110 further includes a wireless interface 322, a network interface 324, a serial and/or parallel interface 326, and a modem 328. Wireless interface 322 allows client device 110 to receive input commands and other information from a user-operated input device, such as from a remote control device or from another IR, Bluetooth, or similar RF input device.

Network interface 324 and serial and/or parallel interface 326 allows client device 110 to interact and communicate with other electronic and computing devices via various communication links. Although not shown, client device 110 may also include other types of data communication interfaces to communicate with other devices. Modem 328 facilitates client device 110 communication with other electronic and computing devices via a conventional telephone line.

Client device 110 also includes an audio output 330 and a video output 332 that provide signals to a television or other device that processes and/or presents or otherwise renders the audio and video data. Although shown separately, some of the components of client device 110 may be implemented in an application specific integrated circuit (ASIC). Additionally, a system bus (not shown) typically connects the various components within client device 110. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

General reference is made herein to one or more client devices, such as client device 110. As used herein, "client device" means any electronic device having data communications, data storage capabilities, and/or functions to process signals, such as broadcast signals, received from any of a number of different sources.

Exemplary EPG System

Figure 4:
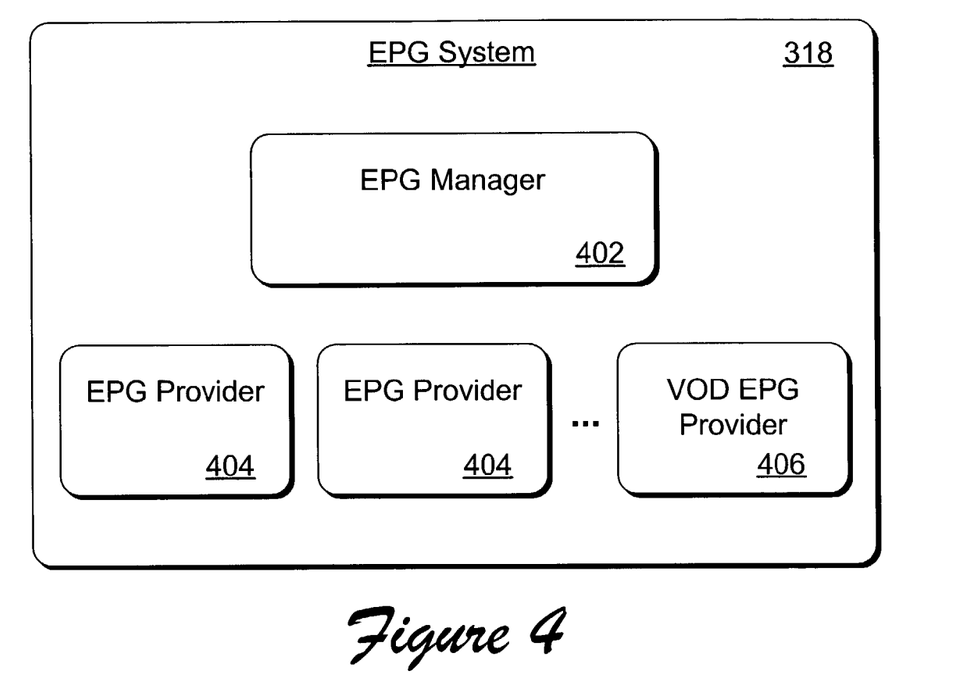
FIG. 4 illustrates selected components of an example EPG system.

FIG. 4 illustrates selected components of EPG system 318 according to one possible implementation. EPG system 318 includes an EPG manager 402, one or more EPG providers 404, and at least one VOD EPG provider 406. EPG manager 402 receives EPG data from the content distribution system 108, and determines an EPG provider 404 or VOD EPG provider 406 that is able to process and display the EPG data.

The EPG providers 404 process and display EPG data that is provided by the program data providers 104 through the content distribution system 108. EPG data may be provided in one or more formats, and the EPG providers 404 are able to process the various formats.

The VOD EPG provider 406 processes and displays EPG data that describes available VOD content. The format of the VOD EPG data is described below in more detail with reference to FIG. 6. When a user makes a selection of EPG data displayed by an EPG provider 404 or a VOD EPG provider 406, the EPG provider 404 or VOD EPG provider 406 generates a content request to facilitate downloading the requested content from the content distribution system 108.

Exemplary VOD Subsystem

Figure 5:
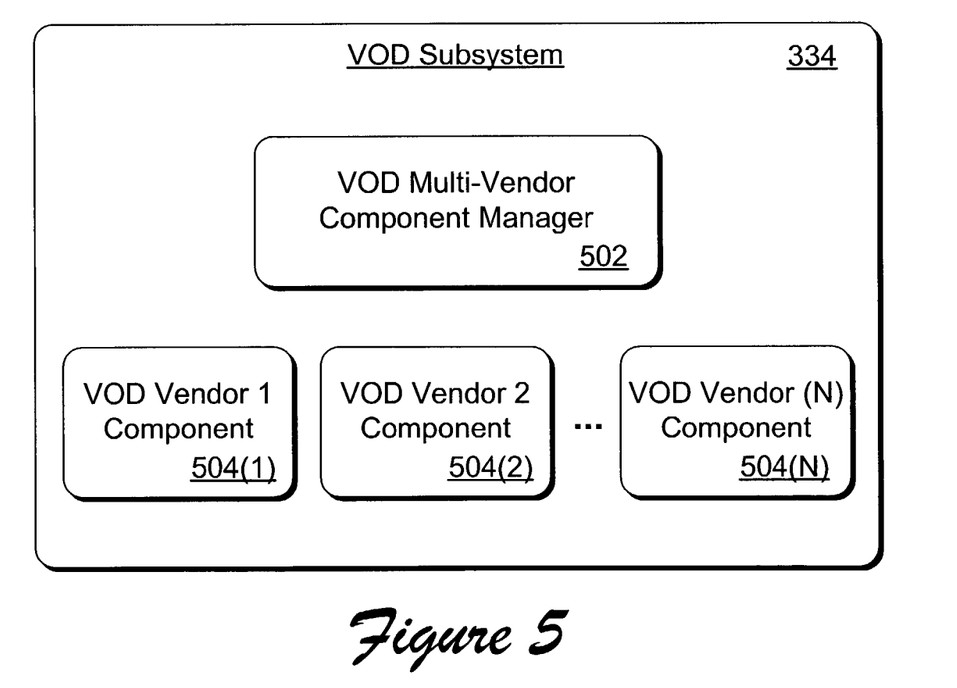
FIG. 5 illustrates selected components of an example VOD DTV source filter.

FIG. 5 illustrates selected components of VOD subsystem 334 according to one possible implementation. VOD subsystem 334 includes a VOD multi-vendor component manager 502 and one or more VOD vendor components 504(1), 504(2), . . . , 504(N). VOD multi-vendor component manager 502 processes VOD content requests and forwards the requests to the appropriate VOD vendor component(s) 504.

VOD vendor components 504(1), 504(2), . . . , 504(N) format one or more vendor-specific requests based on the received VOD content request. For example, VOD vendor component 504(1) generates and sends requests to VOD vendor 1; VOD vendor component 504(2) generates and sends requests to VOD vendor 2; and VOD vendor component 504 (N) generates and sends requests to VOD vendor N.

Client device 110 supports video-on-demand services provided by multiple video-on-demand vendors by supporting dynamic creation and modification of VOD vendor components 504(1), 504(2), . . . , 504(N). If it is determined that the client device 110 will no longer support receiving content from a particular VOD vendor, the VOD vendor component 504 that is associated with the VOD vendor may be removed from the VOD subsystem 334. If an additional VOD vendor is to be supported, a VOD vendor component 504 that is associated with the new VOD vendor may be added to the VOD subsystem 334.

In an exemplary system, the VOD vendor component 504 is a software module that may be managed (e.g., added, removed, or modified) remotely by a content distribution system 108. For example, content distribution system 108 may send computer-executable code across broadcast network 112 to a client device 110. When the client device 110 receives and executes the code, a new VOD vendor component 504 is installed in the VOD subsystem 334.

Exemplary VOD Data Structure

Figure 6:
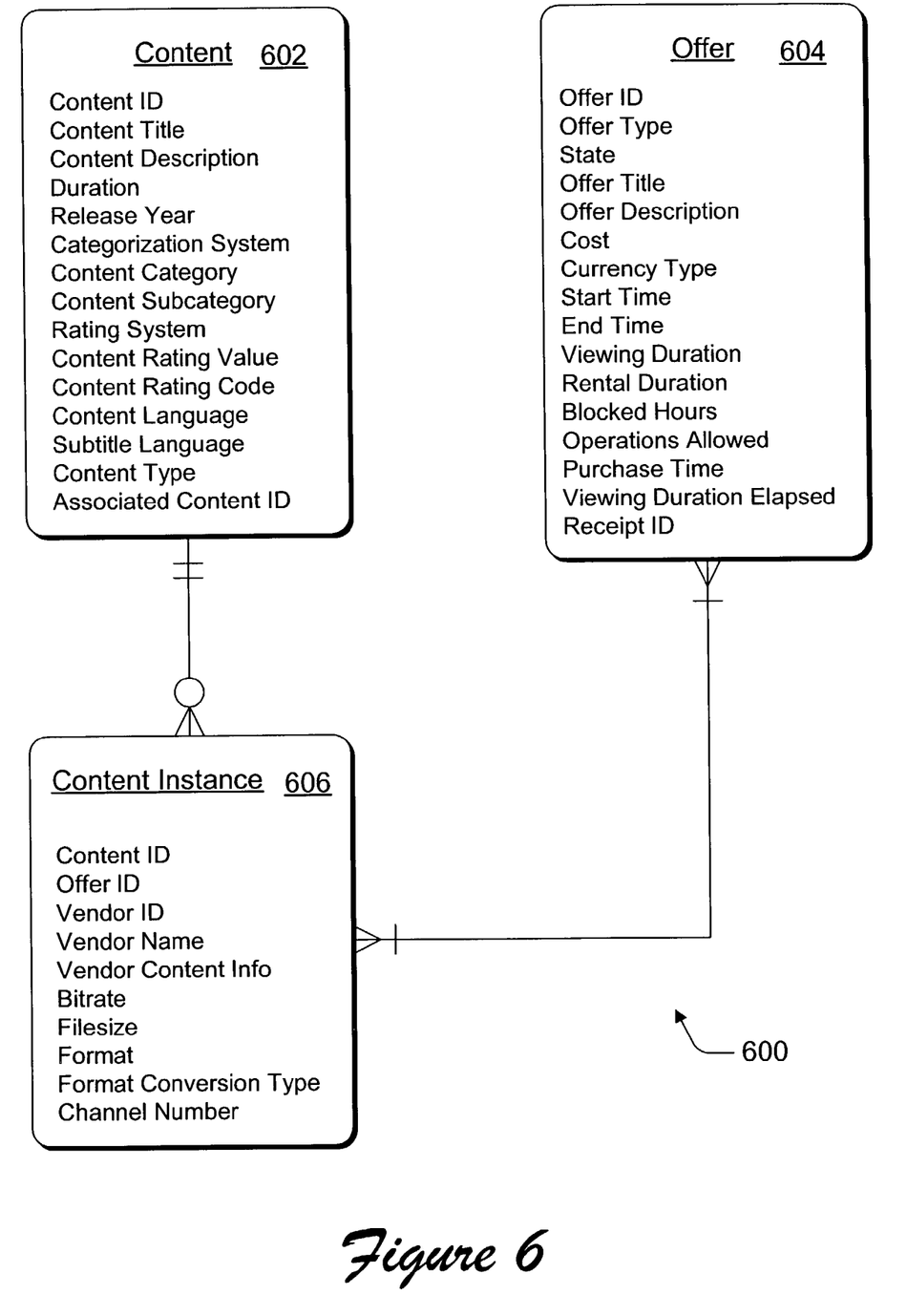
FIG. 6 illustrates an example data structure to support multi-vendor video-on-demand functionality.

FIG. 6 illustrates an example data structure to support multi-vendor VOD functionality. The described data structure may be implemented as a relational database, an object-oriented database, a set of one or more data files, one or more XML files based on an XML schema, or any other data structure method. The VOD content and data processor component 130 of content distribution system 108 processes VOD data received from VOD server 126 to generate VOD offers. Each VOD offer is represented by the described data structure. The structured VOD data is broadcast over broadcast network 112 to client device 110 where it is processed and portions of the data are displayed to the user by EPG system 318. When the user requests a displayed VOD offer, VOD subsystem 334 processes the user request and based on the structured VOD offer data, generates and sends one or more VOD content requests to the content distribution system 108.

Available VOD content (e.g., a movie) is represented by content structure 602. An offer structure 604 represents video-on-demand offers available for users to purchase from a content distribution system. An offer may include one VOD content item (e.g., a movie) or it may include a plurality of VOD content items (e.g., a weekend movie package that includes three different movies). A content instance structure 606 represents VOD content included in an offer, and identifies the vendor that supplies the included VOD content.

For example, an offer that includes one movie from Vendor A would be represented by a data structure that includes one offer record describing the terms of the offer, one content record describing the movie, and one content instance record relating the described move to the terms of the offer and identifying Vendor A as the supplier of the movie. Alternatively, an offer may include three movies, each available from a different vendor: Movie A supplied by Vendor A, Movie B supplied by Vendor B, and Movie C supplied by Vendor C. Such an offer is represented by a data structure that includes one offer record describing the terms of the offer, three content records, each describing one of Movies A, B, and C, and three content instance records, each relating one of the movies to its respective vendor and to the offer.

Content Structure 602

In an exemplary data structure, VOD content (e.g., a movie) is assigned a unique content ID that is associated with descriptive information stored in content structure 602. Descriptive information stored in the content structure 602 may include a content title, a content description, a duration, a release year, a content category, a content rating, a content language, a content type, and an associated content ID. The data stored in content structure 602 is supplied by VOD vendor 106 to content distribution system 108 as part of the VOD data.

In one implementation, the content ID assigned to media content is assigned by a designated media content identification authority, and is unique across all media vendors. In an alternate implementation, the content ID is assigned by the VOD vendor and is guaranteed unique only in relation to other content offered by the same vendor.

The content title field stores the title of the media content, such as a movie title. The content description field stores a description of the media content, such as a short description of the plot of a movie. The duration field stores the duration of the media content in units of time (e.g., seconds). The release year field stores the year in which the content was released.

The categorization system field is an identifier of the system used to categorize the media content as indicated by the values of the category and subcategory fields. The content category field indicates a category in which the media content fits. Example categories may include: movies, new releases, sports, music, series, instructional, news, and specials. The content subcategory field indicates a subcategory in which the media content fits. For example, within the "movie" category, example subcategories may include: horror, comedy, drama, action, fantasy, and family. In an exemplary system, content structure 602 supports a plurality of sets of categorization data. For example, in a data structure implemented as XML files based on an XML schema, the content element may include one or more content category elements, where each content category element includes a categorization system field, a content category field, and a content subcategory field.

The rating system field is an identifier of the system used to rate the media content as indicated by the values of the content rating value and content rating code fields. For example, the Motion Picture Association of America provides a common media rating system that applies to movies. The content rating value field indicates a rating value associated with the media content. Example rating values associated with movies include: G, PG, PG-13, R, and NC-17. The content rating code field Stores a code that is assigned, based on the rating value, to identify a level of authorization within a rating system. In an exemplary system, content structure 602 supports a plurality of sets of content rating data. For example, in a data structure implemented as XML files based on an XML schema, the content element may include one or more content rating elements, where each content rating element includes a rating system field, a content rating value field, and a content rating code field.

The content language field indicates the primary language in which the media content is presented. The subtitle language field indicates the language in which subtitles are provided, if any.

The content type field is used to identify the type of media content being described. Example content types may include: movie, movie preview, advertisement content, and help content. The associated content ID field is used to associate two or more media content descriptions with each other. For example, the associated content ID field is used to associate a movie with a preview for the movie. In the content structure associated with a movie, the associated content ID field contains the content ID assigned to a preview of the movie; in the content structure associated with a movie preview, the associated content ID field contains the content ID assigned to the movie.

Offer Structure 604

In an exemplary system, an offer structure 604 represents video-on-demand offers available for purchase by users of the television entertainment system. An offer ID is a unique identifier assigned by content distribution system 108 to identify media content that is available for purchase. Additional fields within the offer structure 606 describe the offer, provide pricing information, provide terms of the offer, and track purchased offer information, and are generated by the content distribution system 108. The offer type, state, offer title, and offer description fields describe the offer. The cost and currency type fields provide pricing information associated with the offer. The start time, end time, viewing duration, rental duration, blocked hours, and operations allowed fields provide terms of the offer. The purchase time, viewing duration elapsed, and receipt ID fields track information associated with a purchased offer.

The offer description fields include offer type, state, offer title, and offer description. An offer type field is used to indicate the type of offer, for example, a single movie or a movie package such as three James Bond movies available for purchase as a unit. A state field is used to indicate the current state of the offer, for example, possible values may be "Available", meaning that the offered media content may be purchased; "Purchased", meaning that the offer has already been purchased through the client device; or "Expired", meaning that the offered media content is no longer available for purchase. An offer title field is used to indicate the title of the offer. For example, for a single movie, the offer title may simply be the name of the movie. For an offer that includes three James Bond movies, the offer title may be, "James Bond Weekend Special". An offer description field is used to describe the offer. For example, given the "James Bond Weekend Special" example, the offer description field may list the titles of the three James Bond movies included in the offer.

The cost and currency type fields provide pricing information associated with the offer. A cost field is used to indicate the purchase price of the offer. A currency type field is used to indicate the currency associated with the cost field.

Terms of the offer are described using the start time, end time, viewing duration, rental duration, blocked hours, and operations allowed fields. A start time field is used to indicate the time at which the offer will be available. An end time field is used to indicate the time after which the offer will no longer be available. In an exemplary system, the start time and end time are stored in ISO 8601 with trailing "z" format, for example, "2002-10-26T18:39:09Z".

A viewing duration field is used to indicate the maximum amount of time that media content included in an offer can be viewed once it is purchased. For example, an offer that includes one two-hour movie may have a viewing duration of four hours. This would allow a user to purchase the offered movie and view it twice. A rental duration field is used to indicate the length of time during which a user will have access to the purchased media content. For example, an offer may have a rental duration of 3 days. In this case, the user may purchase the offer on a Thursday, and be able to view the purchased media content through Sunday provided the viewing duration is not exceeded). In an exemplary system, the viewing duration and rental duration are stored as a number of seconds.

A blocked hours field is used to indicate times during which the offered media content will not be available. For example, a content distributor (e.g., content distribution system 108) may choose to block the offered media content during prime time in order to preserve a maximum amount of bandwidth to be used for the normally scheduled prime time broadcast. Additionally, a content distributor may offer media content with fewer blocked hours, but at a higher price, for example, charging more for allowing the user to view the purchased media during prime time. In an exemplary implementation, blocked hours are indicated by a string of 48 bit flags, each representing a half-hour block of time, beginning at 12:00 am. A "1" indicates that the time slot is blocked, while a "0" indicates that the time slot is not blocked. For example, the string: "000000000000000000000000000000000000011111111" indicates that the hours between 12:00 am and 8:00 pm are not blocked, but the hours between 8:00 pm and 12:00 am are blocked. Other methods for indicating blocked time periods are contemplated and may include a set of start times and end times that indicate blocked time periods, not restricted to half-hour increments.

An operations allowed field is used to indicate types of operations that the user will be allowed to perform while viewing the offered media content. In an exemplary system, a bit flag is set to indicate whether or not each operation is allowed. The specified operations (in order) include: record, rewind, instant replay, pause, skip ahead, fast forward, and seek. For example, an operations allowed field with the value, "0011111" means that recording and rewinding are disabled and all other operations are enabled. In an exemplary system, unspecified trailing values are assumed to be "0". For example, a value of "01" is interpreted by the system as "0100000" and means that only the rewind operation is enabled. Additional operations may be supported by appending additional bits to the string to specify whether the additional operations are enabled or disabled.

The purchase time, viewing duration elapsed, and receipt id fields of offer structure 604 are used to track information related to purchased offers. A purchase time field indicates at which a user purchased an offer. In an exemplary system, the purchase time field is stored in ISO 8601 with trailing "z" format. A viewing duration elapsed field indicates how much time (e.g., in seconds) any media content associated with the purchased offer has been viewed. For example, if the offer includes three two-hour movies and a user watches all of one movie and then watches one hour of another movie, the viewing duration elapsed field indicates 10800 seconds, which is equivalent to 180 minutes, or 3 hours. A receipt ID field associates a purchased offer with a receipt, which may be stored by a separate billing application.

In one implementation, a billing application may be stored and executed by the content distribution system 108. In an alternate implementation, one or more of the VOD vendors 106 may track billing information using one or more vendor-specific billing applications. Alternatively, some billing information may be tracked by the content distribution system 108, while other billing information is tracked by the one or more of the VOD vendors 106.

Content Instance Structure 606

A content instance structure 606 represents VOD media content associated with an offer and the vendor(s) through which the content is supplied. A content ID field and an offer ID field are used to associate VOD content described in content structure 602 (uniquely identified by the content ID) with an offer described in offer structure 604 (uniquely identified by the offer ID). Multiple content instance records with the same offer ID indicates that an offer includes a plurality of media content, for example, the "James Bond Weekend Special" described above would have three content instance records, each with the same offer ID. A vendor ID field indicates a unique identifier that is associated with a particular VOD vendor. Content distribution system 108 generates the unique content ID/offer ID/vendor ID combinations that define the contents of each offer and the supplier (vendor) of the offer contents (VOD content).

A vendor name field stores the name of the vendor associated with the vendor ID. A vendor content info field is used to store vendor-specific data necessary to generate a request for the VOD content. The format of contents of the vendor content info field is defined by each vendor, and may include several components. For example, one vendor may require a vendor-specific media ID and the duration of the media, while another vendor may require a vendor-specific media ID, the bitrate of the media, and the duration of the media. Additional data that may be required by a VOD vendor 106 may include an identifier of a particular server instance and a protocol that is used to transmit the media content. The vendor content info field is populated based on data received from the VOD vendor, which enables the client device to support multiple VOD vendors, including supporting new VOD vendors added to the architecture and supporting VOD vendors that modify the format requirements for requests submitted to the vendor.

A bitrate field indicates the transmission bit rate of the media content from the vendor in bits per second. A filesize field indicates the size of the media content in bytes. A format field indicates the transmission format of the media content. Examples include: video MPEG, audio MPEG, MPEG program file, MPEG still image, and non-MPEG still image. A format conversion type field indicates what type of conversion, if any, is necessary after the content is received from the vendor. Example format conversion type values include: no conversion, video encode, audio encode, TIFF-to-MPEG, and WAV-to-AIFC. A channel number field is used to indicate the channel on which the user can access the media content after it is purchased.

The vendor ID, vendor name, vendor content info, bitrate, filesize, format, and format conversion type fields are all populated with data received by content distribution system 108 from VOD vendor 106 as VOD data.

In an exemplary system, the content structure 502, offer structure 504, and content instance structure 506 are implemented as one or more XML files. Additional data fields may be added to one or more of the described structures to provide additional details associated with an offer of media content. In addition, other structures may be added to support additional data associated with media content or offers for media content. The EPG system 318 is able to interpret data structured according to on or more XML schemas. Modifications to an XML schema are also readily interpreted by the EPG system.

Methods for Multi-Vendor VOD Support

Multi-vendor VOD support may be described in the general context of computer-executable instructions, such as application modules, being executed by a computer. Generally, application modules include routines, programs, objects, components, data structures, etc. that perform particular tasks or implement particular abstract data types. Multi-vendor VOD support may also be implemented in distributed computing environments where tasks are performed by remote processing devices that are linked through a communications network. In a distributed computing environment, application modules may be located in both local and remote computer storage media including memory storage devices.

Figure 7:
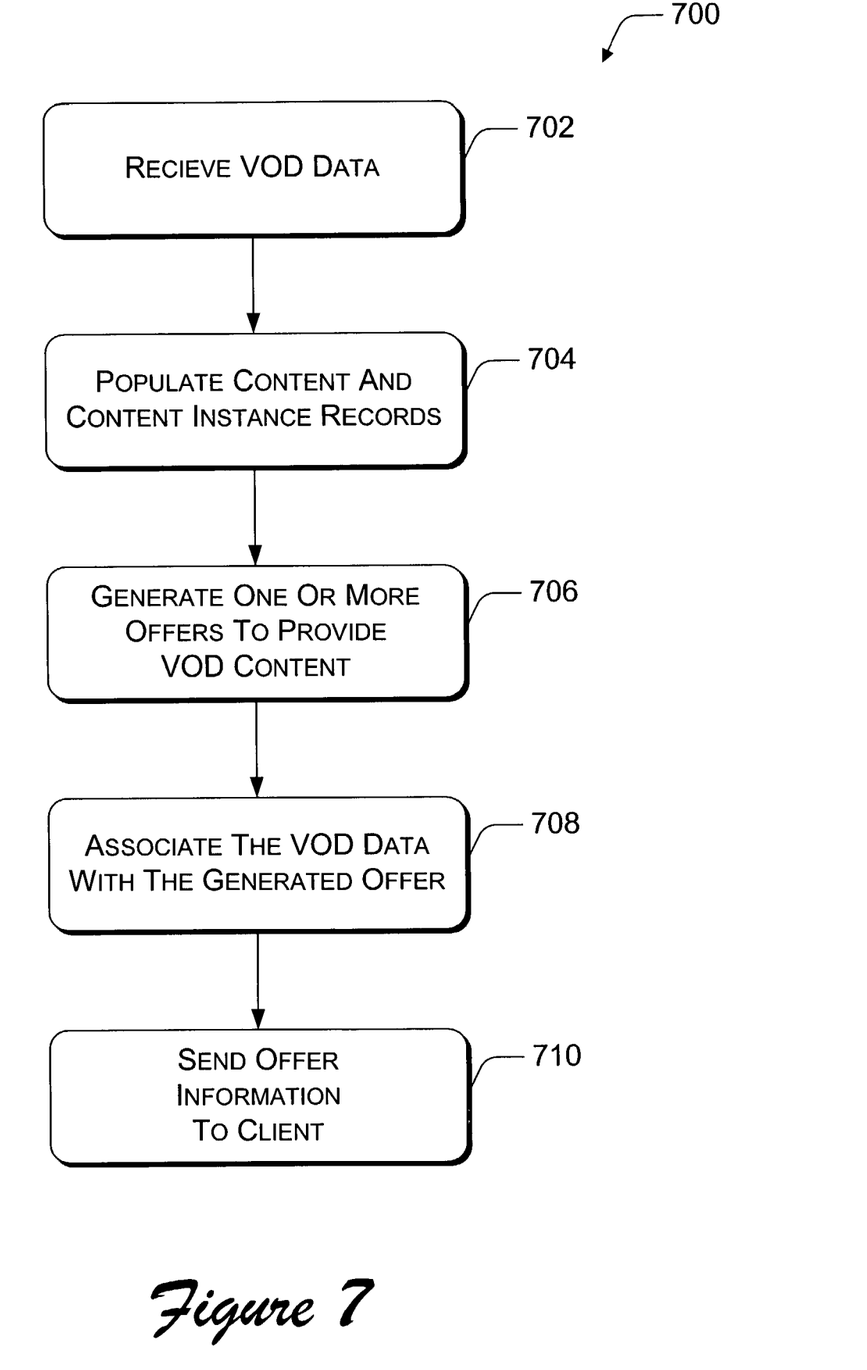
FIG. 7 illustrates a method for generating structured data that represents a multi-vendor video-on-demand offer.

FIG. 7 illustrates a method for generating structured VOD data to support multi-vendor video-on-demand according to the described schema. The order in which the method is described is not intended to be construed as a limitation. Furthermore, the method can be implemented in any suitable hardware, software, it firmware, or combination thereof.

At block 702, a content distribution system receives VOD data from a VOD vendor. For example, content distribution system 108 receives data describing a movie available from VOD vendor 106. The VOD data may include all of the fields shown in content structure 602 and all of the fields shown in content instance structure 606, except for the offer ID and channel number.

At block 704, the content distribution system populates a content data record and a content instance record with the received VOD data. For example, content distribution system 108 builds an XML file that conforms to the described schema, tagging the received VOD data according to content structure 602 and content instance structure 606.

At block 706, the content distribution system generates one or more offers to provide the VOD content described by the received VOD data. For example, content distribution system 108 generates one or more XML files according to offer structure 604.

At block 708, the content distribution system associates the received VOD data with the generated offer. For example, content distribution system 108 adds the contents of the XML file that represents content structure 602 and content instance structure 604 to the XML file that represents offer structure 604. In addition, the offer ID field is added to the content instance structure. Additional content and content instance records may also be added to provide an offer for more than one VOD content. Also, because a vendor ID is associated with each content instance, an offer may be associated with VOD content from a plurality of vendors.

At block 710, the content distribution system broadcasts the generated offers to one or more clients. For example, content distribution system 108 transmits the generated XML files over broadcast network 112 to client devices 110.

Figure 8:
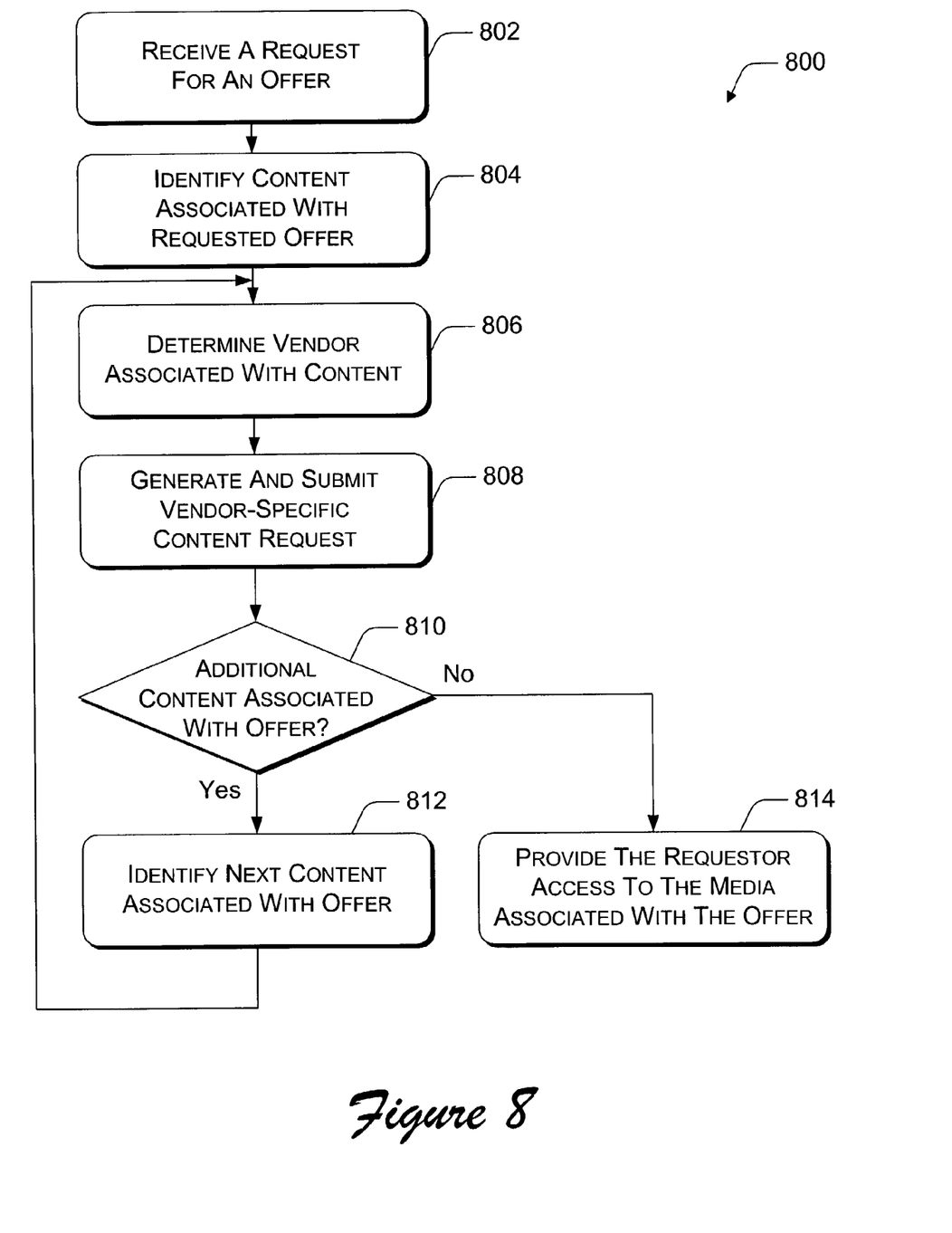
FIG. 8 illustrates a method for supporting multi-vendor video-on-demand.

FIG. 8 illustrates a client method for supporting multi-vendor video-on-demand. The order in which the method is described is not intended to be construed as a limitation. Furthermore, the method can be implemented in any suitable hardware, software, firmware, or combination thereof. Where appropriate, the method will be described with reference to FIGS. 4 and 5.

At block 802, an EPG system 318 receives a request for an offer. For example, a user may select a media content that is described in an EPG displayed by the EPG system, and an indication of the selection is received by the VOD EPG provider 406.

At block 804, the EPG system identifies media content associated with the requested offer. For example, given the data structure described with reference to FIG. 6, VOD EPG provider 406 identifies a content instance record with the offer ID associated with the received offer request, generates a media content request, and forwards the media content request to the VOD subsystem 334.

At block 806, the VOD subsystem determines the vendor associated with the identified media content. For example, VOD multi-vendor component manager 502 extracts the vendor ID and vendor content info field values from the media content request generated at block 804.

At block 808, the VOD subsystem requests the identified media content to be downloaded from the vendor. For example, VOD multi-vendor component manager 502 sends the extracted vendor content info field contents to the appropriate VOD vendor component 504, as determined by the vendor ID field value of the content instance record. VOD vendor component 504 communicates the request to the VOD vendor 106 through content distribution system 108 to facilitate downloading the identified media content.

At block 810, the VOD subsystem 334 determines whether there is additional media content associated with the requested offer. If there is (i.e., "yes" branch from block 810), the VOD subsystem identifies additional media content associated with the requested offer (block 812) in the same way as described with reference to block 804. The process then continues in block 806.

If all of the media content associated with the offer has been identified and requested from the appropriate vendor(s) and there is no more additional content (i.e., the "no" branch from block 810), the VOD subsystem 334 provides the user access to the downloaded media content (block 814).

Figure 9:
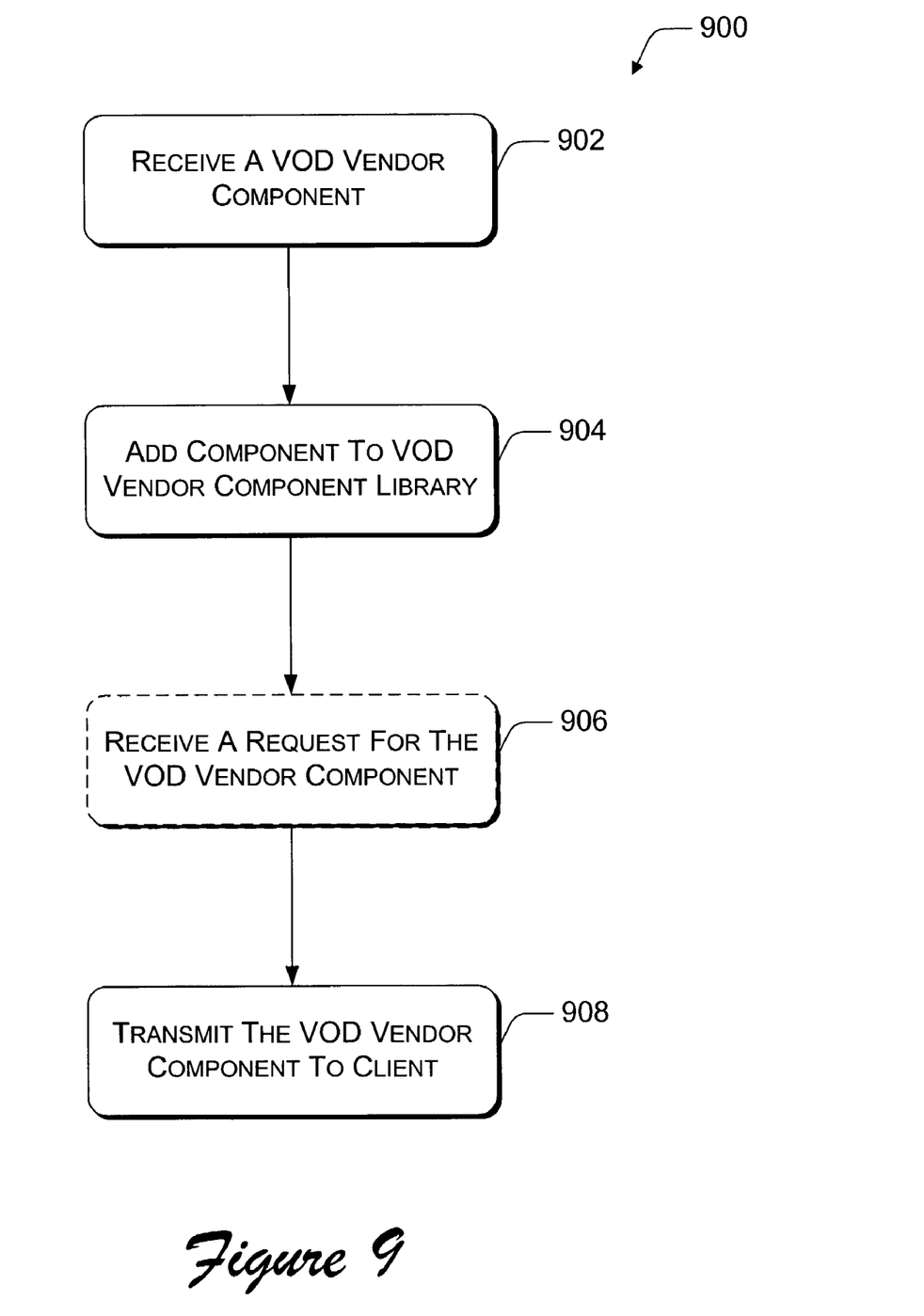
FIG. 9 illustrates a method for supporting additional VOD vendors.

FIG. 9 illustrates a method for enabling client support of additional video-on-demand vendors. The order in which the method is described is not intended to be construed as a limitation. Furthermore, the method can be implemented in any suitable hardware, software, firmware, or combination thereof.

At block 902, a content distribution system 108 receives a VOD vendor component. The VOD vendor component may be received from a VOD vendor or from another entity that supplies VOD vendor components. The VOD vendor component is a software module that can be installed on one or more client devices to enable the client device to generate requests for media content from the VOD vendor associated with the VOD vendor component.

At block 904, the content distribution system 108 adds the received VOD vendor component to the VOD vendor component library 132.

At block 906, the content distribution system 108 optionally receives a request from a client device to download the VOD vendor component. For example, a client device may receive a request for media content available from a VOD vendor for which the client device does not have a VOD vendor component installed. When the client receives the request, the client may ascertain that the desired VOD vendor component is available from the VOD vendor component library of the content distribution system and request download of the VOD vendor component, enabling the client device to request media content from that VOD vendor.

At block 908, the content distribution system 108 transmits the VOD vendor component to the client device. The transmission may occur in response to a request from a client device (as described with reference to block 906), or it may occur subsequent to the content distribution system receiving the VOD vendor component (as described with reference to block 902). Transmitting the VOD vendor component to the client device causes the VOD vendor component to be installed on the client device (e.g., as a new VOD vendor component 504), enabling the client device to generate requests for media content from the VOD vendor associated with the VOD vendor component.

It is further noted that the content distribution system 108 may remove VOD vendor components from the VOD subsystem. For example, a content distribution system 108 may determine that one or more client devices 110 are no longer authorized to request media content from particular VOD vendor. The content distribution system 108 may instruct the client device to uninstall (or otherwise make inactive) the VOD vendor component associated with the VOD vendor.

Conclusion

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method implemented by a television entertainment server system comprising:
   receiving by a video-on-demand server system, data that identifies a first media content that is available on-demand from a first on-demand vendor;
   receiving by a video-on-demand server system, data that identifies a second media content that is available on-demand from a second on-demand vendor;
   generating data describing a single distinct offer comprising the first and second media content that is available on-demand;
   associating the data that identifies the first media content and the data that identifies the second media content with the data describing the single distinct offer;
   transmitting the single distinct offer to a client device;
   receiving from the client device a selection of the single distinct offer;
   in the event a particular one of the first media content vendor or the second media content vendor requires a software component installed on the client device to facilitate the delivery media content to the client device:
      transmitting to the client device a software component associated with a particular media content vendor; and
      transmitting the first and second media content to the client device.

2. The method of claim 1 wherein the associating comprises populating a data structure that relates media content data with offer data.

3. The method of claim 2 wherein the data structure is implemented as at least one XML file.

4. The method of claim 2 wherein the data structure is implemented as a relational database.

5. The method of claim 1 wherein the data that identifies the first media content comprises at least one of a content identifier, a content title, a content description, a content duration, a release year, a content categorization, a content rating, a content language, a content type, and an associated content identifier.

6. The method of claim 5 wherein the data that identifies the first media content further comprises at least one of a vendor identifier, a vendor name, a vendor-specific request format, a bitrate, a filesize, a format, and a format conversion type.

7. The method of claim 1 wherein the data describing the offer comprises at least one of an offer identifier, an offer type, an offer state, an offer title, an offer description, a cost, a currency, a start time, an end time, a viewing duration, a rental duration, a blocked hours indicator, and an operations allowed indicator.

8. A method of data management implemented by an on-demand television media server system, the method comprising:
   modeling by the server system, offers for on-demand television media content with a database schema;
   representing on-demand media content by a content class in the database schema;

representing terms of on-demand media content availability by an offer class in the database schema;

representing vendor-specific content distribution data by a content instance class in the database schema; and creating an association between the content class, the content instance class, and the offer class, the association representing at least one distinct offer the distinct offer comprising a plurality of on-demand media content available from a plurality of media content vendors.

9. The method of claim 8 wherein the content class represents at least one of a content identifier, a content title, a content description, a content duration, a release year, a content categorization, a content rating, a content language, a content type, and an associated content identifier, associated with the on-demand media content.

10. The method of claim 8 wherein the terms of on-demand media content availability comprise at least one of a plurality of terms selected from a list of terms, the list of terms comprising:
an offer identifier,
an offer type,
an offer state,
an offer title,
an offer description,
a cost,
a currency,
a start time,
an end time,
a viewing duration,
a rental duration,
a blocked hours indicator,
an operations allowed indicator,
a purchase time,
a viewing duration elapsed,
and a receipt identifier.

11. The method of claim 8 wherein the vendor-specific content distribution data comprises at least one of a plurality of content distribution data types selected from a list of data types, the list of data types comprising:
a content identifier,
an offer identifier,
a vendor identifier,
a vendor name,
a vendor-specific request format,
a bitrate,
a filesize,
a format,
a format conversion type, and
a channel number.

12. A method implemented by a television entertainment system client comprising:
identifying a plurality of on-demand media vendors from which a client device has been authorized to receive on-demand media content;
determining whether the client device is currently authorized to receive on-demand media content from a particular one of the plurality of on-demand media vendors; and
in an event that the client device is not currently authorized to receive on-demand media content from the particular on-demand media vendor, instructing the client device to deactivate a software component associated with the particular on-demand media vendor, while maintaining an active software component associated with another particular one of the plurality of on-demand media vendors.

13. A computer system configured to provide a vendor interface,
the computer system comprising:
at least one processor,
at least one memory;
at least one computer readable storage medium;
the vendor interface configured to:
receive data that identifies a first on-demand media content that is available on-demand from a on-demand media vendor; and
receive data that identifies a second on-demand media content that is available on-demand from a second on-demand media vendor, the second on-demand media vendor being a different on-demand media vendor from the on-demand media vendor of the first on-demand media content; and
a data processor configured to:
generate data representing terms of an on-demand media offer; and
associate the data that identifies the first and second on-demand media content with the data representing terms of an on-demand media offer, such that the on-demand media offer represents a single distinct on-demand media offer to provide both the first and the second on-demand media content.

14. The system of claim 13 wherein the data processor is configured to associate the data identifying the first and second media content with the data representing terms of an offer by populating a data structure that relates first and second media content data with offer data.

15. One or more computer-readable storage media comprising computer executable instructions that, when executed, direct a computing system to:
receive data that identifies first and second media content that is available on-demand from first and second on-demand media providers, respectively;
generate data describing a single distinct offer comprising the first and second media content; and
populate a data structure that associates the data that identifies the first and second media content with the data describing the single distinct offer, such that the single distinct offer is an offer to provide both the first and second media content on-demand via a television entertainment system.

16. The one or more computer-readable storage media of claim 15 wherein the data structure is implemented as one or more XML files.

17. The one or more computer-readable storage media of claim 15 wherein the data that identifies the media content comprises at least one of a content identifier, a content title, a content description, a content duration, a release year, a content categorization, a content rating, a content language, a content type, and an associated content identifier.

18. The one or more computer-readable storage media of claim 17 wherein the data that identifies the media content further comprises at least one of a vendor identifier, a vendor name, a vendor-specific request format, a bitrate, a filesize, a format, and a format conversion type.

19. The one or more computer-readable storage media of claim 15 wherein the data describing the offer comprises at least one of an offer identifier, an offer type, an offer state, an offer title, an offer description, a cost, a currency, a start time, an end time, a viewing duration, a rental duration, a blocked hours indicator, and an operations allowed indicator.

20. A method implemented by a television entertainment system server, the method comprising:

maintaining a library of multiple vendor software components for installation at a client device to facilitate generation by the client device of vendor-specific on-demand media requests, the library including vendor software components associated with different on-demand media vendors;

receiving a vendor software component that is not currently in the library; and adding the vendor software component to the library for subsequent distribution to a client device;

modeling offers for on-demand media content with a database schema whereby:

media content that is available on-demand is represented by a content class;

terms of media content availability is represented by an offer class;

vendor-specific content distribution data is represented by a content instance class; and an association between the content class, the content instance class, and the offer class represents individual distinct offers of a plurality of on-demand media content, each of the particular content available from one of a plurality of vendors;

receiving at the server:

media data that identifies media content that is available on-demand; and vendor data that identifies distribution data associated with a particular vendor from which a particular media content identified by the media data is available;

storing the media data according to the content class;

storing the particular vendor data according to the content instance class;

generating data describing an offer to provide the plurality of media content from the plurality of vendors to a client device;

storing the data describing a particular offer according to the offer class;

transmitting to a client device:

a particular one of the vendor software components that is associated with a particular on-demand media vendor from which a particular on-demand media content identified by the media content is available; and a representation of the offer, such that:

the offer is presented to a user via the client device; and the client device, in response to a user request to purchase the on-demand media offer, interfaces with the each of the particular vendors from which the media content is available via the particular one of the vendor software components to access the on-demand media content associated with the on-demand media offer.

* * * * *